United States Patent
Dankberg et al.

(10) Patent No.: US 8,385,817 B2
(45) Date of Patent: Feb. 26, 2013

(54) MULTI-BAND SATELLITE COMMUNICATION FADE MITIGATION

(75) Inventors: Mark D. Dankberg, Encinitas, CA (US); Daryl T. Hunter, Carlsbad, CA (US); Charles N. Pateros, Carlsbad, CA (US)

(73) Assignee: ViaSat, Inc., Carlsbad, CA (US)

( * ) Notice: Subject to any disclaimer, the term of this patent is extended or adjusted under 35 U.S.C. 154(b) by 370 days.

(21) Appl. No.: 12/814,270

(22) Filed: Jun. 11, 2010

(65) Prior Publication Data

US 2011/0143656 A1 Jun. 16, 2011

Related U.S. Application Data

(60) Provisional application No. 61/186,539, filed on Jun. 12, 2009.

(51) Int. Cl.
*H04B 17/02* (2006.01)
(52) U.S. Cl. ......... 455/10; 455/3.02; 455/13.3; 455/427
(58) Field of Classification Search .............. 455/10, 455/3.02, 13.3, 13.1, 430, 12.1, 427, 9, 428, 455/429, 431, 63.1, 67.11; 342/358, 357; 370/208, 209, 342
See application file for complete search history.

(56) References Cited

U.S. PATENT DOCUMENTS

| | | | |
|---|---|---|---|
| 6,813,476 B1 * | 11/2004 | Brooker | 455/10 |
| 2003/0025041 A1 | 2/2003 | Higgins | |
| 2003/0054816 A1 | 3/2003 | Krebs et al. | |
| 2008/0055152 A1 | 3/2008 | Hudson et al. | |
| 2012/0127921 A1 * | 5/2012 | Laufer | 455/10 |

OTHER PUBLICATIONS

International Search Report and Written Opinion mailed Dec. 27, 2010 in Application No. PCT/US2010/038548 filed Jun. 14, 2010, 9 pages.
European Telecommunications Standards Institute, "Digital Video Broadcasting (DVB): Interaction Channel for Satellite Distribution Systems," ETSI EN 301 790, May 2009, pp. 1-166.
European Telecommunications Standards Institute, "Digital Video Broadcasting (DVB): Second Generation Framing Structure, Channel Coding and Modulation Systems for Broadcasting, Interactive Services, News Gathering and Other Broadband Satellite Applications (DVB-S2)," ETSI EN 302 307 (v 1.2.1), Aug. 2009, pp. 1-78.
Fritz et al., "Military Satellite Communications: Space-Based Communications for the Global Information Grid," Johns Hopkins APL Technical Digest, 2006, vol. 27 (1), pp. 32-40.
Hart, David, "Satellite Communications," [online], 1997, Retrieved from the Internet<URL: http://www.cis.ohio-state.edu/~jain/cis788-97/satellite_nets/index.htm, pp. 1-14.
Hole, K. J. And G.E. Øien, "Adaptive Coding and Modulation: A Key to Bandwidth-Efficient Multimedia Communications in Future Wireless Systems," *Telektronikk*, 2001, vol. 1, pp. 1-8.

(Continued)

*Primary Examiner* — John J Lee
(74) *Attorney, Agent, or Firm* — Kilpatrick Townsend & Stockton LLP/ViaSat (57) ABSTRACT

One or more satellites may generate multiple beams. The beams may facilitate communication over multiple communication frequency bands including a relatively high capacity frequency band and a relatively fade-resilient frequency band. The beams may overlap. User terminals and/or gateways in a beam intersection may select from among the multiple communication frequency bands to communication with the satellite(s). Responsive to detection of rain fade, some of the user terminals and/or gateways may be instructed to use the relatively fade-resilient frequency band. The multiple communication frequency bands may be assigned to the user terminals and/or gateways so as to maximize total system capacity.

22 Claims, 11 Drawing Sheets

OTHER PUBLICATIONS

Vandermeulen, Ric and Bill Hwang, "Advancing Military Satellite Communications with Open Standards: the Joint IP Modem," *American Institute of Aeronautics and Astronautics*, [online], 092407, Retrieved from the Internet <URL: http://www.viasat.com/files/assets/Government%20satcom%20systems/ing_MilSatcom_with_Open_Standards_-_The_JIPM.pdf, pp. 1-4.

Kawai, M.; Ogawa, E.; Taniguchi, Y.; , "Study on hybrid multibeam satellite communication system with cross frequency bands," *Global Telecommunications Conference, 1988 and Exhibition. 'Communications for the Information Age.' Conference Record, GLOBECOM '88., IEEE* , vol., No., pp. 1752-1756 vol. 3, Nov. 28-Dec. 1, 1988.

Tanaka, M.; Nakamura, M.; Kawai, M.; Ohtomo, I.; , "Experimental fixed and mobile multibeam satellite communications system," *Communications, 1989. ICC '89, BOSTONICC/89, Conference record. 'World Prosperity Through Communications', IEEE International Conference on* , vol., No., pp. 1587-1594 vol. 3, Jun. 11-14, 1989.

\* cited by examiner

MULTI-BAND SATELLITE COMMUNICATION FADE MITIGATION

CROSS-REFERENCE TO RELATED APPLICATIONS

This application claims the benefit of U.S. Provisional Application No. 61/186,539, filed Jun. 12, 2009, titled "Multi-Band Satellite Communication Fade Mitigation," and having Client Reference No. VS-0369-US, the contents of which are hereby incorporated in its entirety by reference.

TECHNICAL FIELD

The present invention relates to satellite communication in general and in particular to multi-band satellite communication.

BACKGROUND

Consumer broadband satellite services are gaining traction in North America with the start up of star network services using Ka-band satellites. While such first generation satellite systems may provide multi-gigabit per second (Gbit/s) per satellite overall capacity, the design of such systems can inherently limit the number of customers that may be adequately served with a high level of availability.

While existing designs have a number of capacity limitations, the demand for such broadband services continues to grow. The past few years have seen strong advances in communications and processing technology. This technology, in conjunction with selected innovative system and component design, may be harnessed to produce a novel satellite communications system to address this demand.

BRIEF SUMMARY

The present invention relates to methods and apparatus for maximizing the availability of a high-rate satellite communication system by the use of multiple frequency bands. In some implementations, one frequency band is used by at least some users with a clear line of sight, while another frequency band is used by users with a degraded line of sight (e.g., due to rain fade). In some implementations, one frequency band is used by gateway/hubs while another frequency band is used by the user terminals.

Implementations within the scope of the invention may include: earth to space and/or space to earth links; single and/or multiple satellites; usage of ACM (Adaptive Coding and Modulation) and/or CCM (Constant Coding and Modulation); satellite beam power and/or frequency band layout based on a priori determination of rain statistics.

In at least one embodiment of the invention, one or more satellites may generate multiple beams. The beams may facilitate communication over multiple communication frequency bands including a relatively fade-resilient frequency band. The beams may overlap. User terminals and/or gateways in a beam intersection may select from among multiple communication frequency bands to communication with satellite(s). Responsive to detection of rain fade, some of the user terminals and/or gateways may be instructed to use the relatively fade-resilient frequency band. The multiple communication frequency bands may be assigned to the user terminals and/or gateways so as to maximize total system capacity.

This Brief Summary is provided to introduce a selection of concepts in a simplified form that are further described below in the Detailed Description. This Brief Summary is not intended to identify key or essential features of the claimed subject matter, nor is it intended to be used as an aid in determining the scope of the claimed subject matter. Other objects and/or advantages of the present invention will be apparent to one of ordinary skill in the art upon review of the Detailed Description and the included drawings.

BRIEF DESCRIPTION OF THE DRAWINGS

Various embodiments in accordance with the present disclosure will be described with reference to the drawings, in which.

Same numbers are used throughout the disclosure and figures to reference like components and features.

DETAILED DESCRIPTION

Figure 1:
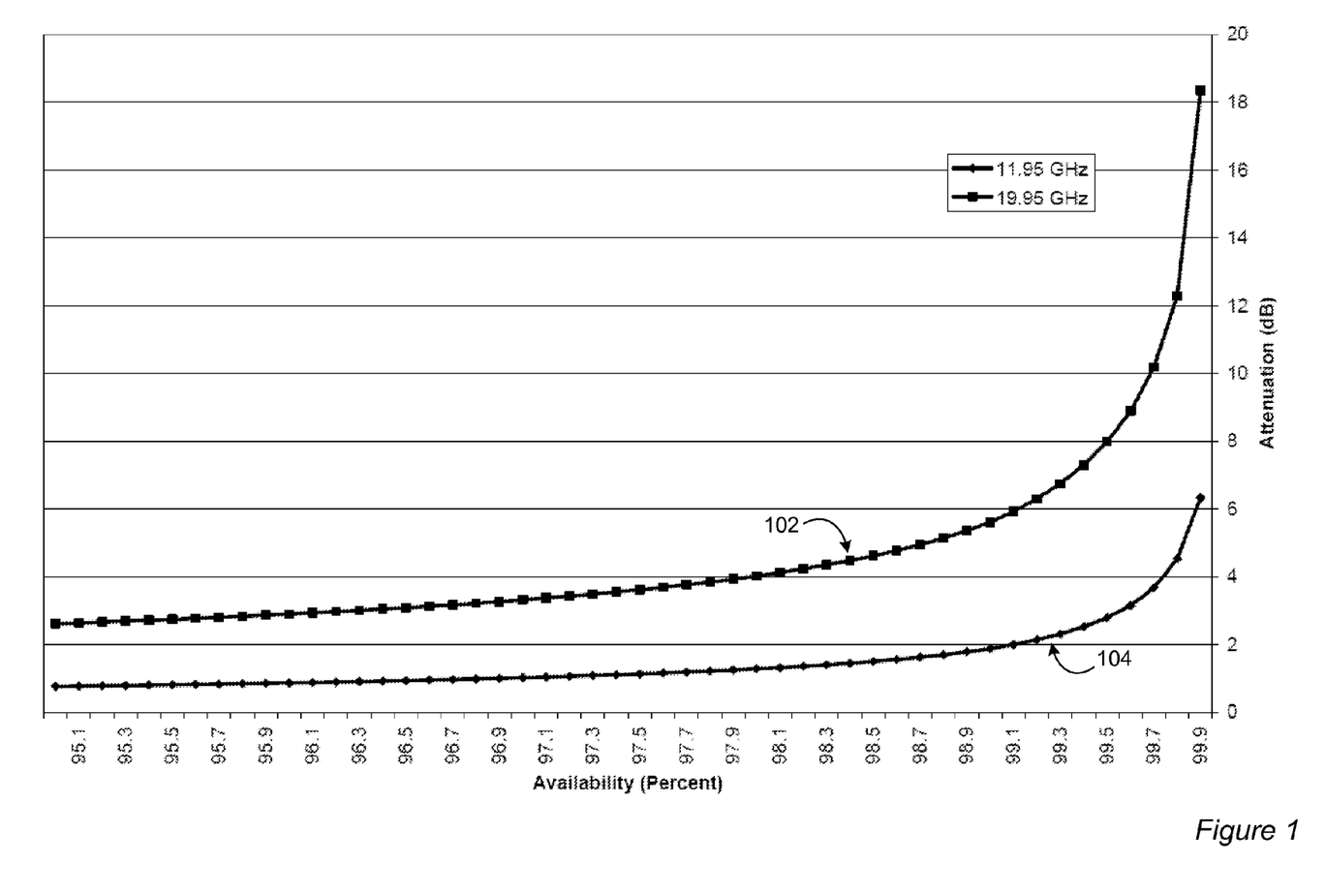
FIG. 1 is a graph illustrating aspects of example relationships between rain fade attenuation margin and Space to Earth communication channel availability in accordance with at least one embodiment of the invention.
Figure 2:
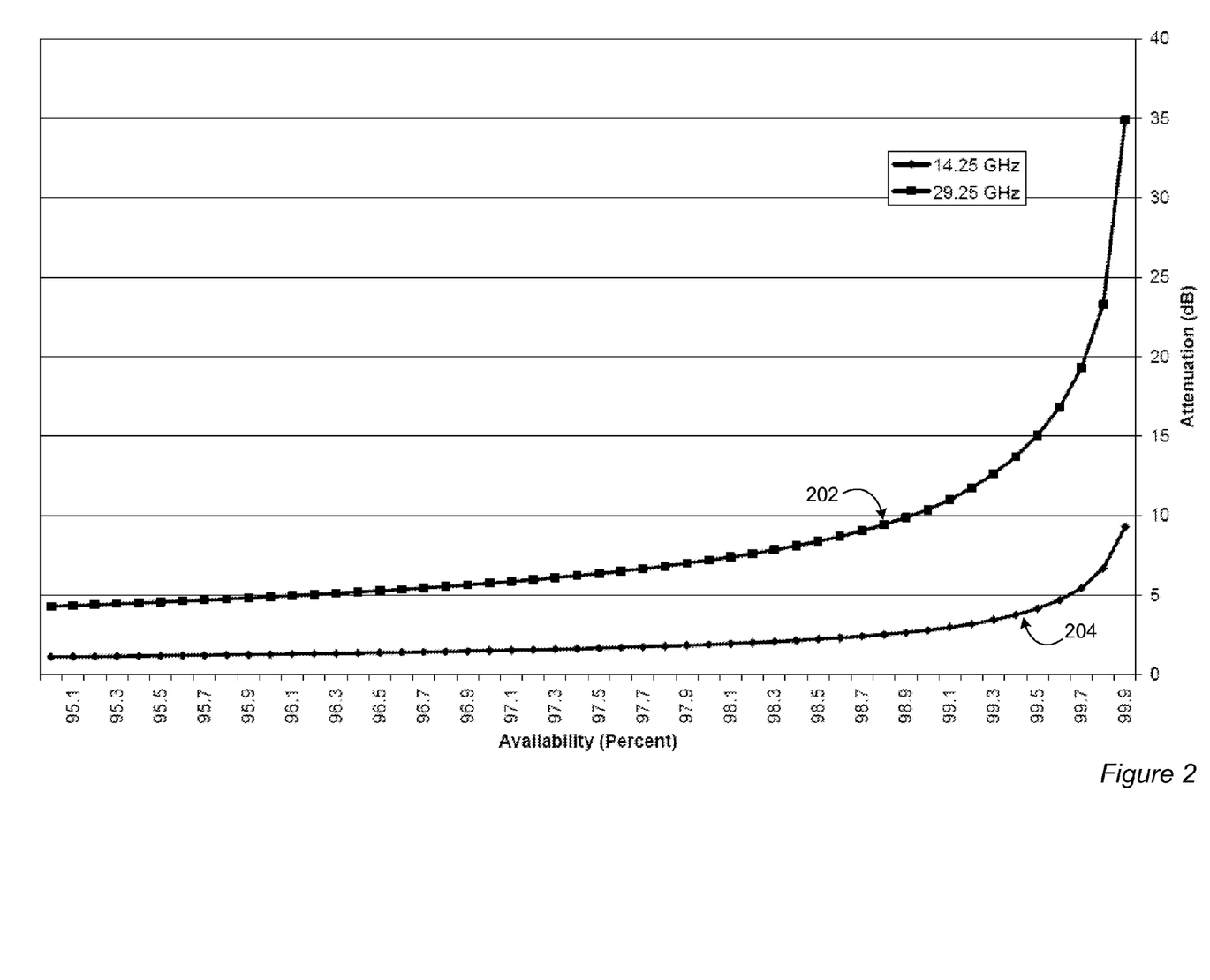
FIG. 2 is a graph illustrating aspects of example relationships between rain fade attenuation margin and Earth to Space communication channel availability in accordance with at least one embodiment of the invention.

With respect to satellite communications, higher frequency bands such as Ka-band may have a higher communication capacity (e.g., with respect to users, throughput and/or bandwidth) relative to lower frequency bands such as Ku-band. For example, the higher communication capacity of higher frequency bands may be due at least in part to greater frequency spectrum allocations associated with higher frequency bands and/or to smaller spot beam sizes associated with higher frequency bands enabling greater frequency reuse. In contrast, lower frequency bands may have a higher availability (e.g., of communication resources such as bandwidth) relative to higher frequency bands. For example, the higher availability of lower frequency bands may be due at least in part to higher frequency bands having a higher susceptibility to rain fade. FIG. 1 and FIG. 2 illustrate.

FIG. 1 represents two commonly used Space to Earth frequency bands (namely, 11.95 GHz and 19.95 GHz) and FIG. 2 represents the corresponding Earth to Space frequency bands (14.25 GHz and 29.25 GHz, respectively). Each plotted point represents an estimated rain fade attenuation margin (Y axis) required to obtain a given level of availability (X axis) for a particular geographic region (in this case, Miami, Fla.). The data was obtained using standard techniques for availability determination well known to those of skill in the art. The numbers are provided solely as an illustrative example and are not meant to represent any particular implementation. Any suitable communication frequency band may be utilized in accordance with at least one embodiment of the invention.

As indicated by the curves 102 and 104 of FIG. 1, the estimated rain fade attenuation margin ("fade margin") required for the higher frequency band is higher than that required for the lower frequency band for all plotted levels of availability. For example, at 99.9% availability, a fade margin of about 18.4 dB is required for the higher frequency band, while a fade margin of only 6.3 dB is needed for the lower frequency band. At 97% availability, a fade margin of about 3.3 dB is required for the higher frequency band, while a fade margin of about 1.0 dB is required for the lower frequency band. Thus, the higher frequency band requires almost 15 dB more fade margin to increase from 97% to 99.9% availability, while the lower frequency band requires only about 5.3 dB more fade margin for the same increase in availability. In accordance with at least one embodiment of the invention, the higher frequency band is more fade-susceptible relative to the lower frequency band. The lower frequency band is more fade-resilient relative to the higher frequency band.

Examining FIG. 2 for the corresponding Earth to Space data, the upper curve 202 shows that, for the higher frequency band, the required fade margins are 34.8 dB and 6 dB for 99.9% and 97% availability, respectively. The lower curve 204 show that, for the lower frequency band, the fade margins are 9.3 dB and 1.5 dB for 99.9% and 97% availability, respectively. Thus in the Earth to Space path, the higher frequency band requires an additional 29.1 dB to improve availability from 97% to 99.9% while the lower frequency band only requires an additional 7.8 dB for the same improvement. Again, in accordance with at least one embodiment of the invention, the higher frequency band is more fade-susceptible relative to the lower frequency band, and the lower frequency band is more fade-resilient relative to the higher frequency band.

In at least one embodiment of the invention, multiple frequency bands, including a suitable higher (fade-susceptible) frequency band and a suitable lower (fade-resilient) frequency band, are made available for Earth to Space and/or Space to Earth communication. Suppose, in such a "multi-band" system, the individual frequency bands were operated at 97% availability level fade margins. One might expect an improved joint availability due to the multiple possible frequency bands available for each user terminal. Indeed, if the higher and lower frequency bands were affected by different, uncorrelated events, the joint availability (e.g., probability that at least one band is usable) would soar to almost 99.9%. However, events causing impairment of the two frequency bands are typically highly correlated (e.g., the same rain typically affects both frequency bands). In this case, the resulting joint availability is still only about 97%.

In at least one embodiment of the invention, the higher, fade-susceptible frequency band has a higher communication capacity with respect to the lower, fade-resilient frequency band. Accordingly, a relatively high proportion of users may be assigned to the higher frequency band. Demand for the lower capacity, lower frequency band may surge in response to atmospheric disturbances such as storms. The surge demand statistics for the higher availability (e.g., fade-resilient) frequency band (e.g., with respect to user requests and/or automated decisions to switch to the higher availability frequency band) may be a function of the spatial correlation of storms and the co-location of users. For example, if storms are small in size and satellite communication user terminals ("user terminals") are evenly distributed over a large service area, the surge capacity required in the higher availability frequency band may be relatively low. On the other hand, if storms are large in size and/or the user terminals are clustered, then a relatively high surge capacity may be required to maintain a same overall system availability.

Figure 3:
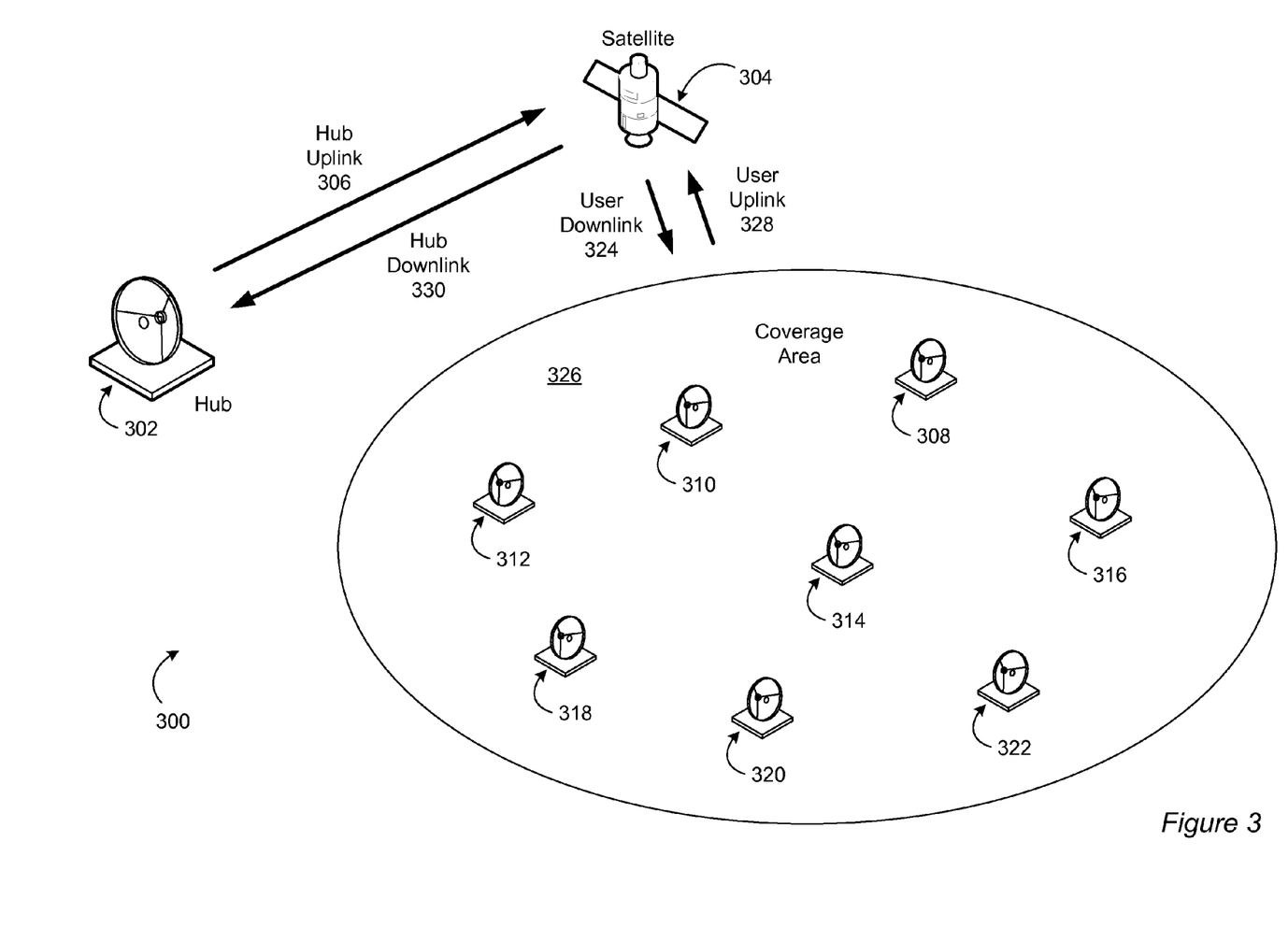
FIG. 3 is a schematic diagram depicting aspects of an example satellite communication system in accordance with at least one embodiment of the invention.

In at least one embodiment of the invention, fade-affected user terminals are switched over to an alternate frequency band that is more resilient to fading. FIG. 3 depicts an example satellite communication system 300 in accordance with at least one embodiment of the invention. The satellite communication system 300 depicted in FIG. 3 is an example of a hub-spoke satellite communication system. As will be apparent to those of skill in the art, each embodiment of the invention is not so limited, and satellite communication systems may incorporate any suitable architecture and/or topology including mesh.

In the example satellite communication system 300 of FIG. 3, a hub 302 transmits data traffic and control information to a communication relay satellite 304 through the use of hub uplink signals 306. These signals 306 may be in one Earth to Space frequency band or a number of Earth to Space frequency bands, as the system 300 design dictates. The signal or signals 306 are received by the satellite 304, processed and retransmitted to user terminals (UT) 308-322 via one or more user downlink signals 324. These signals 324 may again be in one Space to Earth frequency band or a number of Space to Earth frequency bands, as the system design dictates. In some embodiments, the same frequency band or bands used in the hub uplinks 306 are re-used by the user terminals 308-322. The user terminals 308-322 receive and demodulate the appropriate Space to Earth user downlink signals 324 to recover the data traffic and control information for the subject user terminal from the hub 302. Such systems 300 may contain many hundreds or thousands of user terminals 308-322 in one coverage area 326, so each user terminal 308, 310, 312, 314, 316, 318, 320, 322 shown in the figures may represent a large number of physical terminals.

When the user terminal 308-322 has information to be sent to the hub 302, it transmits data traffic and control information to the communication relay satellite 304 through the use of user uplink signals 328. These signals 328 may be in one Earth to Space frequency band or a number of Earth to Space frequency bands, as the system design dictates. The signal or signals 328 are received by the satellite 304, processed and retransmitted to the hub terminal 302 via one or more user downlink signals 330. These signals 330 may again be in one Space to Earth frequency band or a number of Space to Earth frequency bands, as the system design dictates. In some embodiments, the same frequency band or bands used in the user uplinks 328 are re-used by hub terminals such as the hub 302. The hub 302 terminal receives and demodulates the user downlink signals 330 to recover the data traffic and control information from the subject user terminal 308-322 to the hub 302.

Examples of satellite communication system 300 configurations in accordance with at least one embodiment of the invention, including example hubs suitable for the hub 302, example satellites suitable for the satellite 304, example user terminals suitable for the user terminals 308-332, as well as example uplink 306, 328 and downlink 324, 330 encodings, are described in European Telecommunications Standards Institute (ETSI) standard EN 301 709, "Digital Video Broadcasting (DVB); Interaction channel for satellite distribution systems," version 1.5.1, published May 2009, and/or ETSI standard EN 302 307, "Digital Video Broadcasting (DVB); Second generation framing structure, channel coding and modulation systems for Broadcasting, Interactive Services, News Gathering and other broadband satellite applications (DVB-S2)," version 1.2.1, published August 2009.

Figure 4:
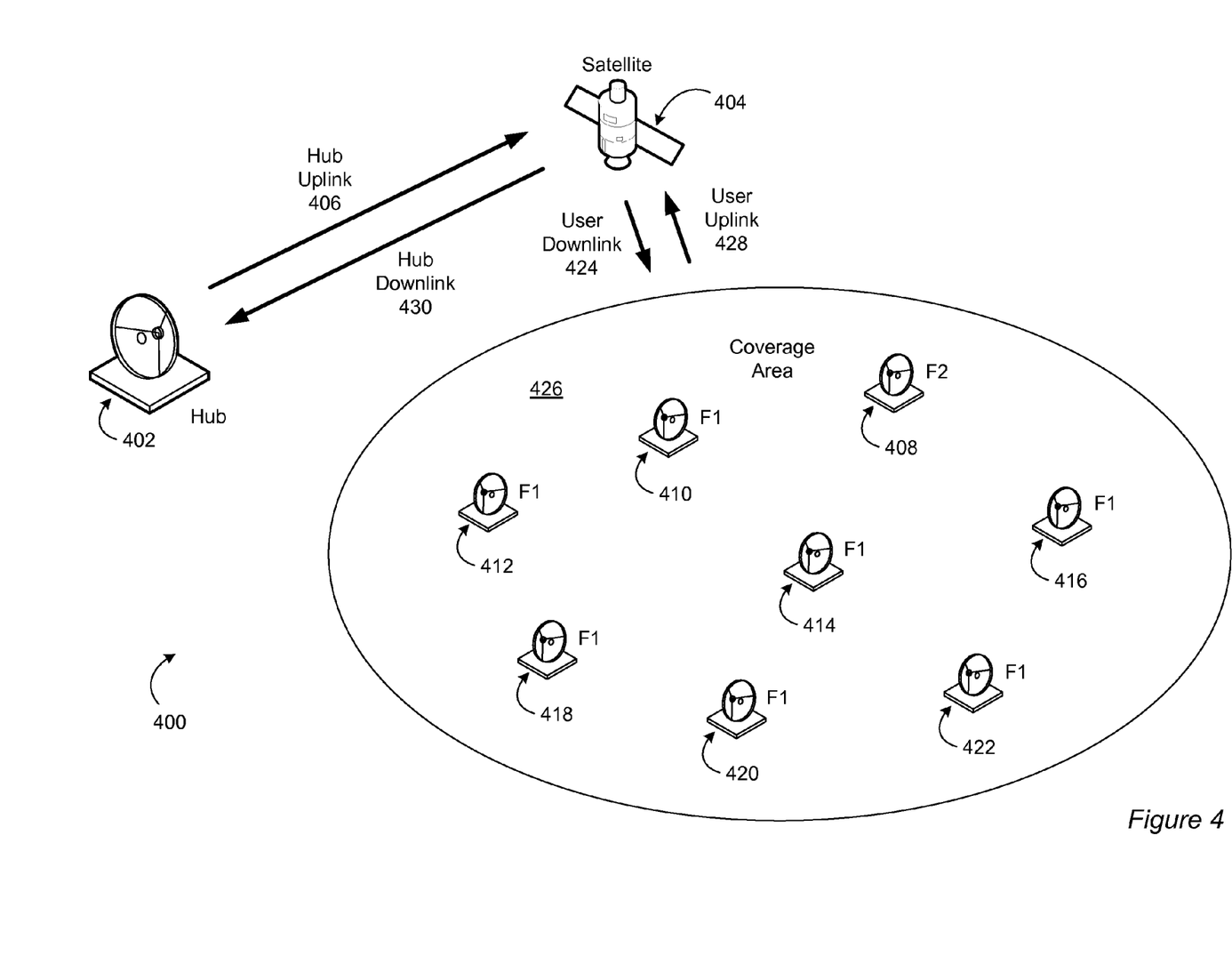
FIG. 4 is a schematic diagram depicting aspects of an example frequency allocation in accordance with at least one embodiment of the invention.

FIG. 4 depicts an example satellite communication system 400 in accordance with at least one embodiment of the invention. The satellite communication system 400 includes components 402-430 corresponding to the components 302-330, respectively, of the satellite communication system 300 of FIG. 3. Furthermore, the user terminals 408-422 are able to communicate with the satellite 404 over multiple frequency bands including a higher capacity frequency band F1 that is fade-susceptible (e.g., subject to degradation by rain) and a lower capacity frequency band F2 that is fade-resilient (e.g., has a higher availability in rain). As described above, the higher capacity frequency band F1 may correspond to a higher frequency band, and the lower capacity frequency band F2 may correspond to a lower frequency band. These frequency designations (i.e., F1 and F2) may apply to either the user downlinks or user uplinks, since, for at least the purposes of this description, the process by which atmospheric disturbances such as rain attenuates a signal is roughly equivalent in the two directions.

In the example depicted in FIG. 4, the system 400 is under clear sky conditions at each of the user terminals 408-422, so a small group of terminals 408 is chosen at random (e.g., pseudorandomly) to use the lower capacity frequency band F2 when the system 400 is operated above the capacity of the higher capacity frequency band F1. For example, the higher capacity frequency band F1 may have a higher communication capacity with respect to information throughput and/or bandwidth relative to the lower capacity frequency band F2. The lower communication capacity may be shared by a smaller number of users, thus yielding a roughly equivalent performance across the total user population 408-422. Alternative to, or in addition to, choosing terminals at random for the lower capacity frequency band(s) F2, choices can be made based at least in part on weather forecasts, previous conditions, etc.

Figure 5:
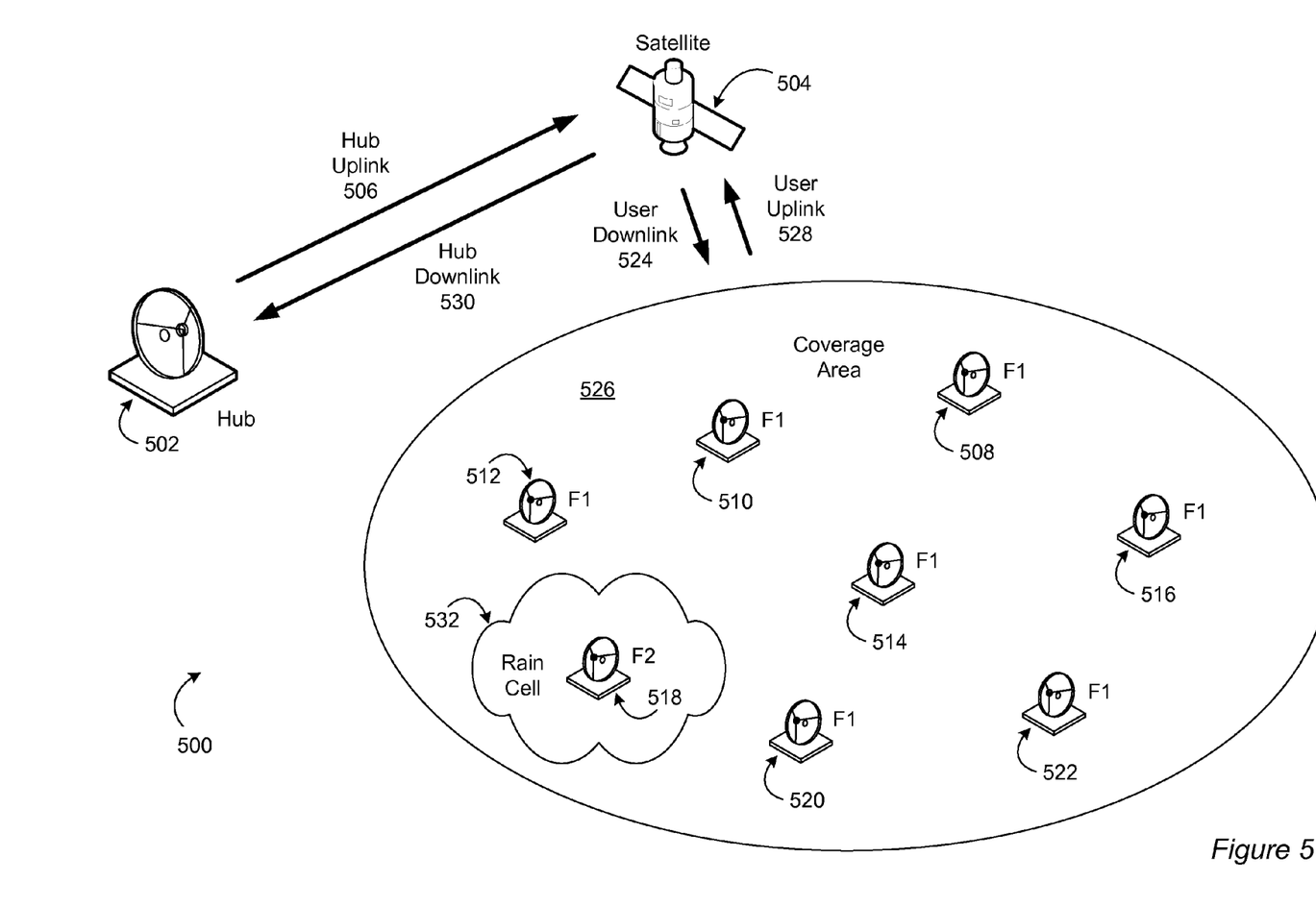
FIG. 5 is a schematic diagram depicting aspects of another example frequency allocation in accordance with at least one embodiment of the invention.

FIG. 5 depicts an example satellite communication system 500 in accordance with at least one embodiment of the invention. The satellite communication system 500 includes components 502-530 corresponding to the components 402-430, respectively, of the satellite communication system 400 of FIG. 4. In FIG. 5, a rain cell 532 has entered the coverage area 526 and is affecting a number of user terminals 518. In this example, the affected terminals 518 are assigned to the lower capacity frequency band(s) F2 and the previous users 508 of the lower capacity frequency band F2 are re-assigned to the higher capacity frequency band F1.

Figure 6:
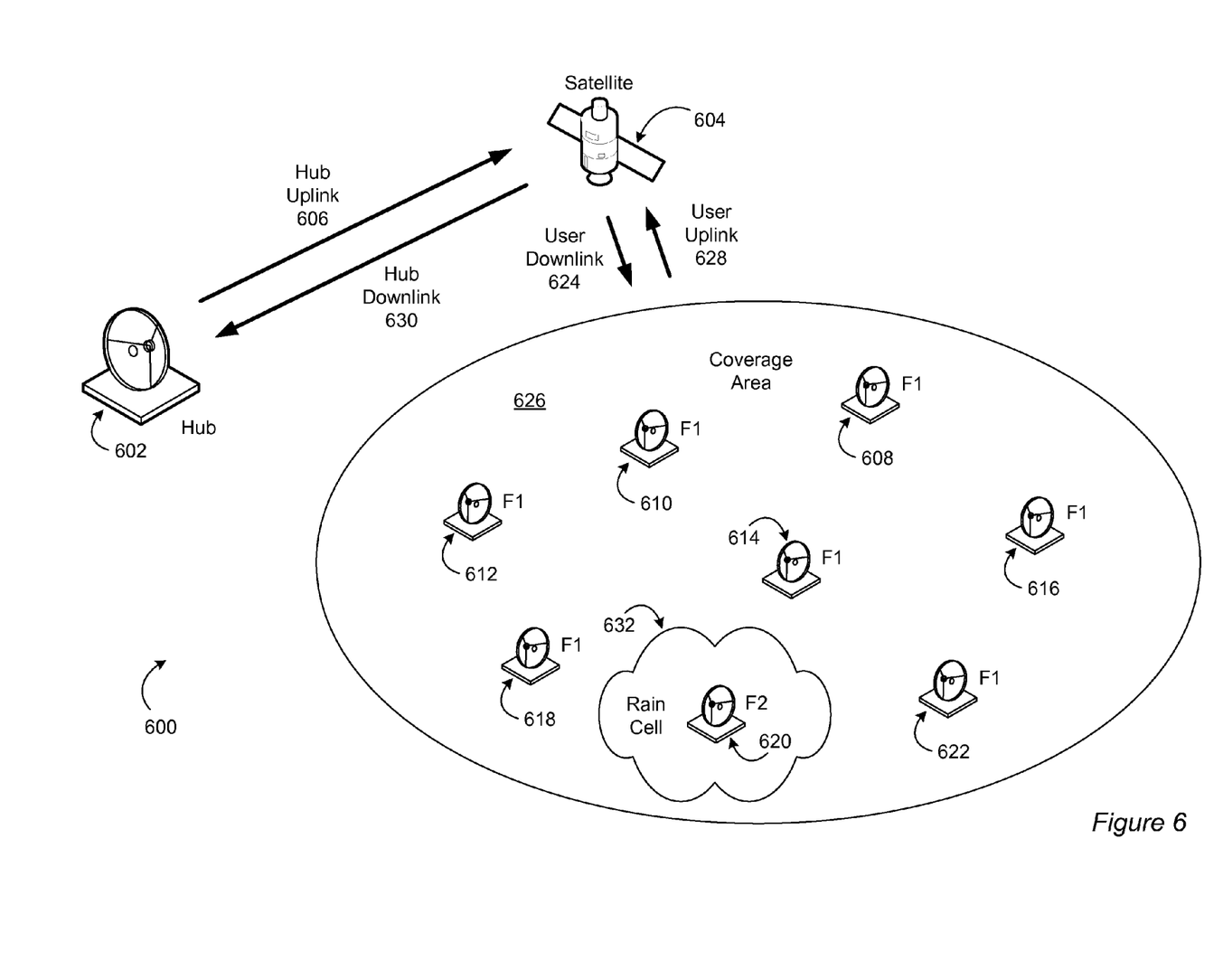
FIG. 6 is a schematic diagram depicting aspects of still another example frequency allocation in accordance with at least one embodiment of the invention.

FIG. 6 depicts an example satellite communication system 600 in accordance with at least one embodiment of the invention. The satellite communication system 600 includes components 602-630 corresponding to the components 502-530, respectively, of the satellite communication system 500 of FIG. 5. In FIG. 6, the rain cell 532 of FIG. 5 (labeled rain cell 632 in FIG. 6) has moved to another set of user terminals 620 and the process continues. The terminals 618 that had needed the fade-resilient frequency band F2 are now in the clear, so they are re-assigned back to the higher capacity frequency band F1, while the new set of terminals 620 are assigned to the fade-resilient frequency band F2.

In Constant Coding and Modulation (CCM) satellite communication systems, the amount of data that can be transmitted per unit time is fixed, and is determined by the link budget. Adaptive Coding and Modulation (ACM) satellite communication systems maximize the number of data bits that are transmitted per unit time by adjusting modulation and coding to match link conditions. When link conditions are poor (e.g., characterized by a low signal-to-noise ratio due to a high rain fade intensity), a low order (power efficient) modulation is typically used and many redundant error correction bits are typically sent per data bit to deliver data to a receiver reliably. Accordingly, fewer data bits may be sent per unit time (i.e., a variable capacity of the link is lower). When link conditions are good (e.g., characterized by a high signal-to-noise ratio due to a low rain fade intensity) a higher order (bandwidth efficient) modulation can be used, and fewer redundant error correction bits need to be sent per data bit, so more data bits are sent per unit time (i.e., the variable capacity of the link is higher). Example ACM schemes in accordance with at least one embodiment of the invention are described in Hole et al., "Adaptive Coding and Modulation, A Key to Bandwidth-Efficient Multimedia Communications in Future Wireless Systems," Telektronikk, Volume 1, 2001.

In systems where the signal from one transmitter reaches many receivers, link conditions for each receiver can vary. In the satellite communication system 600, for example, one signal 624 is broadcast to thousands of receivers 608-622, and a localized rain fade might attenuate the signal for dozens or hundreds of receivers 620, while thousands 608-618 and 622 are unaffected. In such a system 600, when data packets are addressed to a single terminal (unicast), the packets can be sent using the most efficient modulation and coding that the unique link will support. When data packets are addressed to many receivers (multicast or broadcast), the packets are typically sent using the modulation and coding that the receiver with the worst link in the group can support.

In accordance with at least one embodiment of the invention, ACM can be used to extend the range of conditions under which both the high and low availability frequency bands may be employed. An issue with using ACM, however, is that the streams of data at lower modulation and code points will use more of the overall link capacity to carry the same number of bits as a stream using higher modulation and code points. Accordingly, the system operator can maximize the total system capacity by switching users to the high availability/lower capacity frequency band when their modulation and codepoints are such that the high capacity/lower availability frequency band is operating inefficiently (e.g., less efficiently than if a user of a degraded link were switched to an alternate frequency band). Often in practice, however, the capacity of the lower capacity frequency band is much less than that of the higher capacity band. Thus, in many practical systems, such an optimization scheme will result in transfer to the lower capacity frequency band only when the high capacity link is very severely degraded (e.g., can no longer be closed at the high capacity frequency band).

In designing a communication satellite such as the satellite 600 in accordance with at least one embodiment of the invention, one may take advantage of a priori knowledge that certain portions of the coverage area 626 are subject to more atmospheric disturbance than other portions of the subject coverage area. For example, the geographical area covered by rain cell 632 may have associated historical weather statistics indicating a relatively high probability of rain fade with respect to, say, the geographical area containing user terminals 616. Individual beams of the satellite 604 may thus be allocated among multiple frequency bands based at least in part on anticipated channel conditions. A beam operating in a fade-resilient frequency band may be directed so as to cover the geographical area covered by rain cell 632. The power allocated to the beams may also be adjusted to reflect these conditions. For example, a beam operating in a fade-susceptible frequency band that covers the geographical area covered by rain cell 632 may be operated at a higher power level relative to another beam operating in the fade-susceptible frequency band that covers the geographical area containing user terminals 616.

Figure 7:
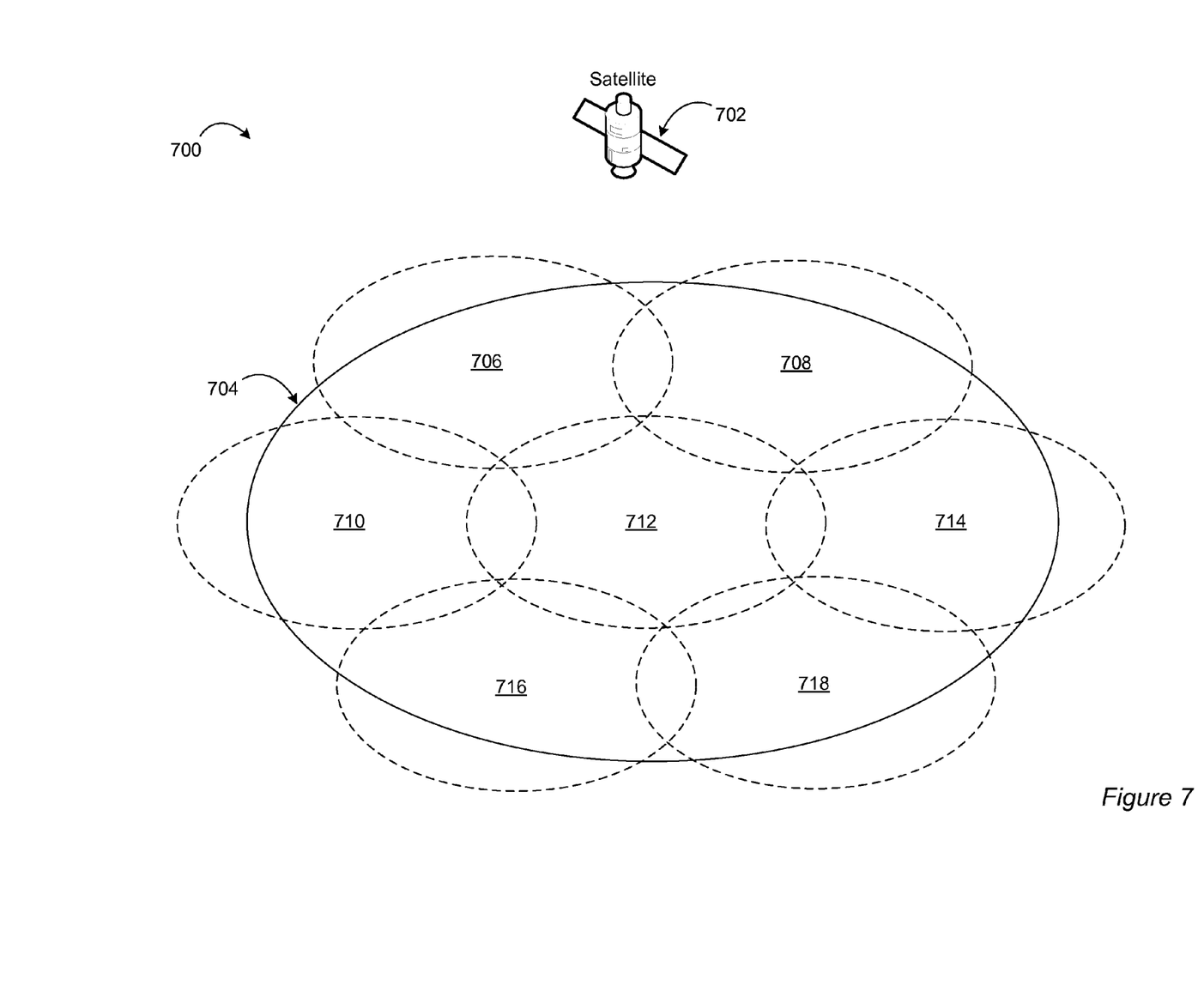
FIG. 7 is a schematic diagram depicting aspects of example overlapping satellite beams in accordance with at least one embodiment of the invention.

FIG. 7 depicts an example satellite configuration 700 in accordance with at least one embodiment of the invention. A satellite 702 illuminates the surface of the Earth with eight beams 704-718. One or more of the lower capacity frequency band beams is made broader than the beam(s) of the higher capacity frequency band. In FIG. 7, seven smaller "spot" beams 706-718 (or, more strictly, their intersections with the surface of the Earth) operating in the higher capacity frequency band are substantially contained by (and therefore intersect) one larger beam 704 operating in the lower capacity frequency band. For example, small spot beams 706-718 at Ka-band may be deployed over a large area (i.e., the union of the spot beams 706-718). A Ku-band beam 704 substantially covering the whole large area may also be deployed, supporting a large proportion of the users of the Ka-band system who are unable to close their link due to atmospheric conditions. In accordance with at least one embodiment of the invention, the chance of severe weather over a large percent of the coverage area 704 at any given time is small.

Figure 8:
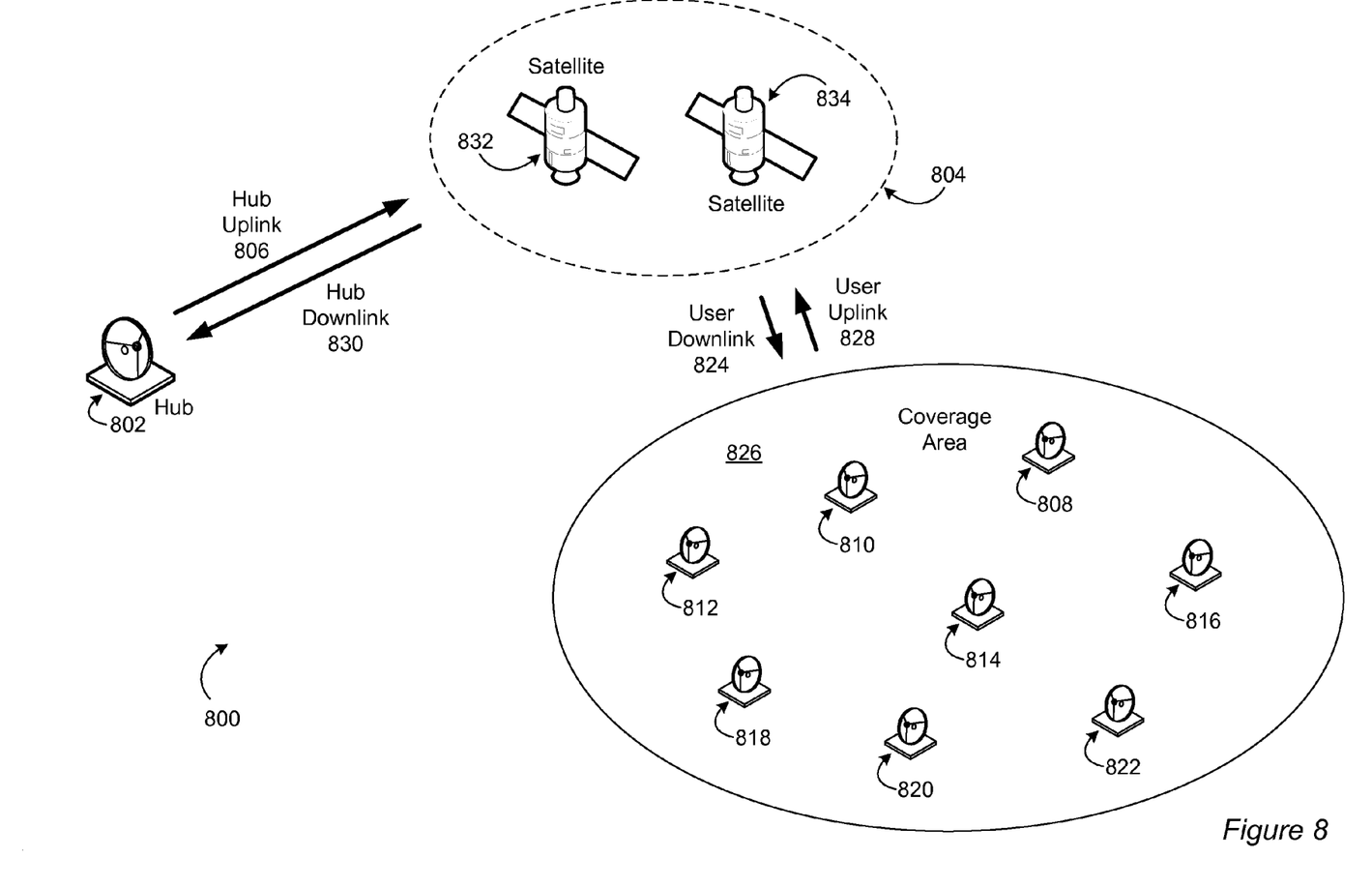
FIG. 8 is a schematic diagram depicting aspects of an example satellite communication system including multiple satellites in accordance with at least one embodiment of the invention.

In accordance with at least one embodiment of the invention, a cost-effective strategy is to minimize the physical size and power on the communication satellite that is dedicated to the lower capacity frequency band. In at least one embodiment of the invention, a satellite cluster including multiple satellites provides communication services over multiple frequency bands. FIG. 8 depicts an example satellite communication system 800 in accordance with at least one embodiment of the invention. The satellite communication system 800 includes components 802 and 806-830 corresponding to the components 602 and 606-630, respectively, of the satellite communication system 600 of FIG. 6. The satellite communication system 800 further includes multiple satellites 832, 834 operating as a satellite cluster 804. Although, for clarity, FIG. 8 depicts just two satellites 832, 834, satellite communication systems in accordance with at least one embodiment of the invention may include any suitable number of satellites.

In at least one embodiment of the invention, an entire satellite is dedicated to the higher capacity frequency band. For example, the satellite 832 may be an existing Ka-band communication satellite. When a new Q or V-band communication satellite 834 is launched, the older satellite 832 may be integrated into the cluster 804. In at least one embodiment of the invention, some of the user terminals 808-822 may have to accommodate the multiple satellites 832, 834 through the use of separate antenna feeds or completely separate antennas, etc.

The multiple satellites 832, 834 may be each owned by the same party, or the capacity of some or all of the satellites 804 may be leased from other parties. Furthermore, the requirements for the lower capacity frequency may be seasonal, giving the system operator the ability to either lease out at least a portion of this fade-resilient capacity (or release their lease) during certain periods.

Figure 9:
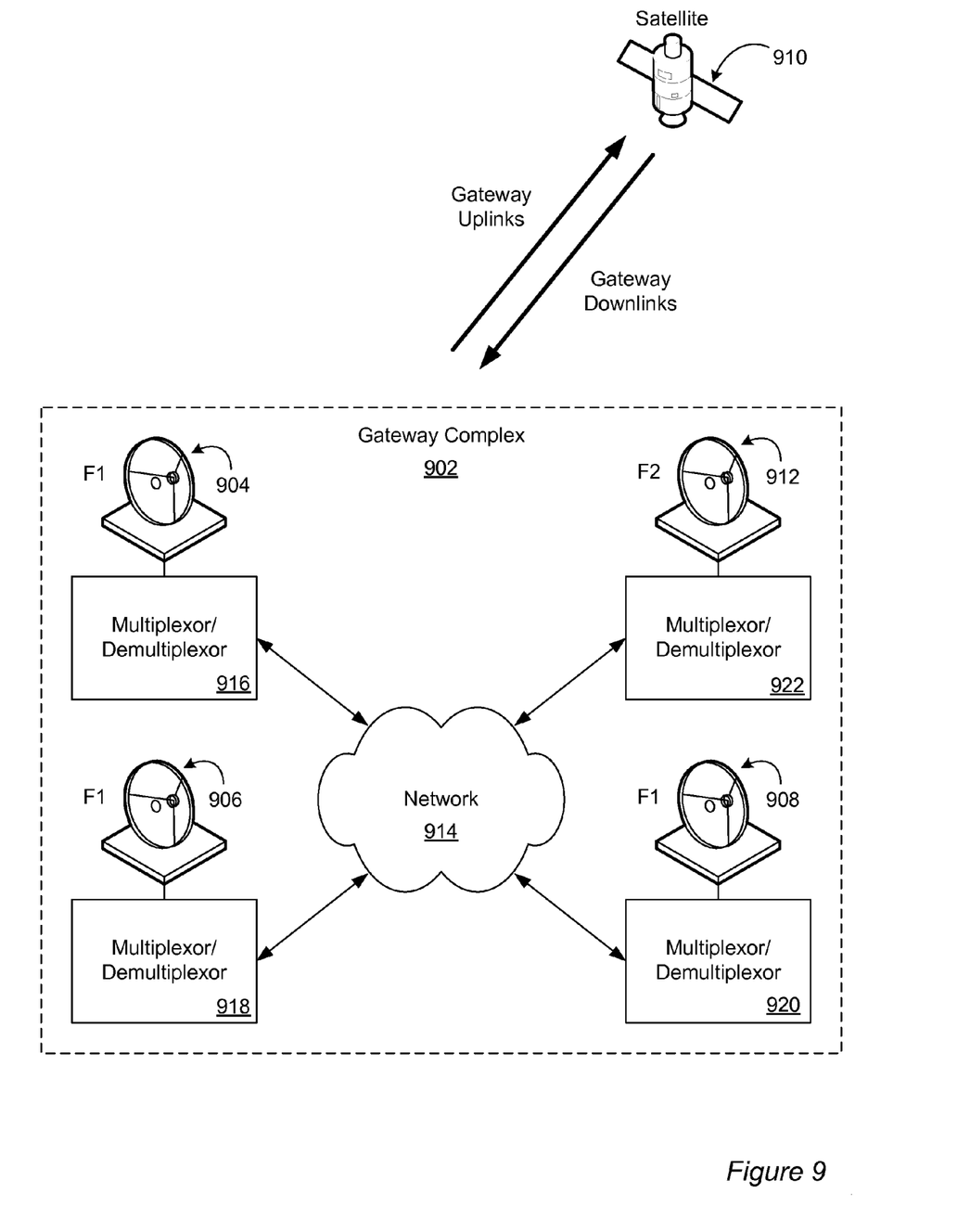
FIG. 9 is a schematic diagram depicting aspects of an example satellite communication gateway complex in accordance with at least one embodiment of the invention.

In at least one embodiment of the invention, satellite communication gateways used for the high capacity frequency band may be different than gateways used for the low capacity frequency band. FIG. 9 depicts aspects of an example satellite communication gateway complex 902 in accordance with at least one embodiment of the invention. The example gateway complex 902 includes multiple gateways 904, 906 and 908 communicating with a satellite and/or satellite cluster 910 over the high capacity frequency band F1, as well as a gateway 912 communicating with the satellite 910 over the low capacity frequency band F2.

For example, a Ka-band spot beam system may use the three gateways 904, 906 and 908 to cover a large number of user beams (e.g., spot beams 706-718 of FIG. 7). A backup Ku-band system with service over the entire Ka-band coverage area (e.g., beam 704) may be served by the single gateway 912. The gateway 912 can be collocated with one or more of the Ka-band gateways 904, 906, 908, or geographically isolated. In any case, when a user terminal is switched between the higher capacity frequency band F1 and the lower capacity frequency band F2, data traffic flow to the user terminal is switched to and from the appropriate gateway modem. This may be as simple as routing between two different modems at a single site to routing between graphically distant gateways via some sort of backhaul, typically a fiber-optic terrestrial backhaul. A network 914 may incorporate a suitable backhaul.

In accordance with at least one embodiment of the invention, a number of gateways 904, 906, 908, 912 operating primarily at the physical layer may be serviced by one or more data multiplexor/demultiplexors 916, 918, 920, 922 that interface to the network 914, to one another 916, 918, 920, 922 and/or to other networks such as the internet. The multiplexor/demultiplexors 916, 918, 920, 922 may provide a data interface to one or more gateways at Ku or other appropriate bands.

To avoid backhaul requirements, lower capacity frequency band gateways can be collocated with each higher capacity frequency band gateway. In this case, the lower capacity frequency band forward channel from the gateway to the user terminals may be shared among the gateways, for example, with in a Time-Division Multiple Access (TDMA) sharing scheme.

In accordance with at least one embodiment of the invention, the design of a user terminal 810 (FIG. 8) that operates in multiple frequency bands is more complex than that of a single frequency terminal. In accordance with some embodiments of the invention, multiple antenna reflectors, multiple antenna feeds, multiple outdoor units and/or multiple modems may be incorporated into the user terminal 810. Some users may not desire the high availability provided by the multi-band system 800 (e.g., with respect to a particular cost-benefit analysis), while other users may be located in a geographic area that naturally provides the required availability due to its climate (e.g., a desert).

Accordingly, the system 800 may incorporate a variety of additional user terminal types, including:

A high rate, low availability user terminal, in which communication capability with respect to at least one fade-resilient frequency band is omitted.

A low rate, high availability user terminal, in which communication capability with at least one high capacity frequency band is omitted. These can also be legacy terminals deployed for previous generation systems. In this context, high availability refers to the availability as compared to a similar terminal operating at the higher capacity frequency band. The availability of these terminals may actually be less than the availability of the high rate, low availability user terminals.

A low availability user terminal of high or low rate. An example application for such user terminals is utility metering, which requires regular connections, but the exact timing of the connection is typically less important. In this case, the system may schedule communication around the user terminal's and/or others' weather (as well as scheduling around other system constraints such as time critical broadcasts).

Figure 10:
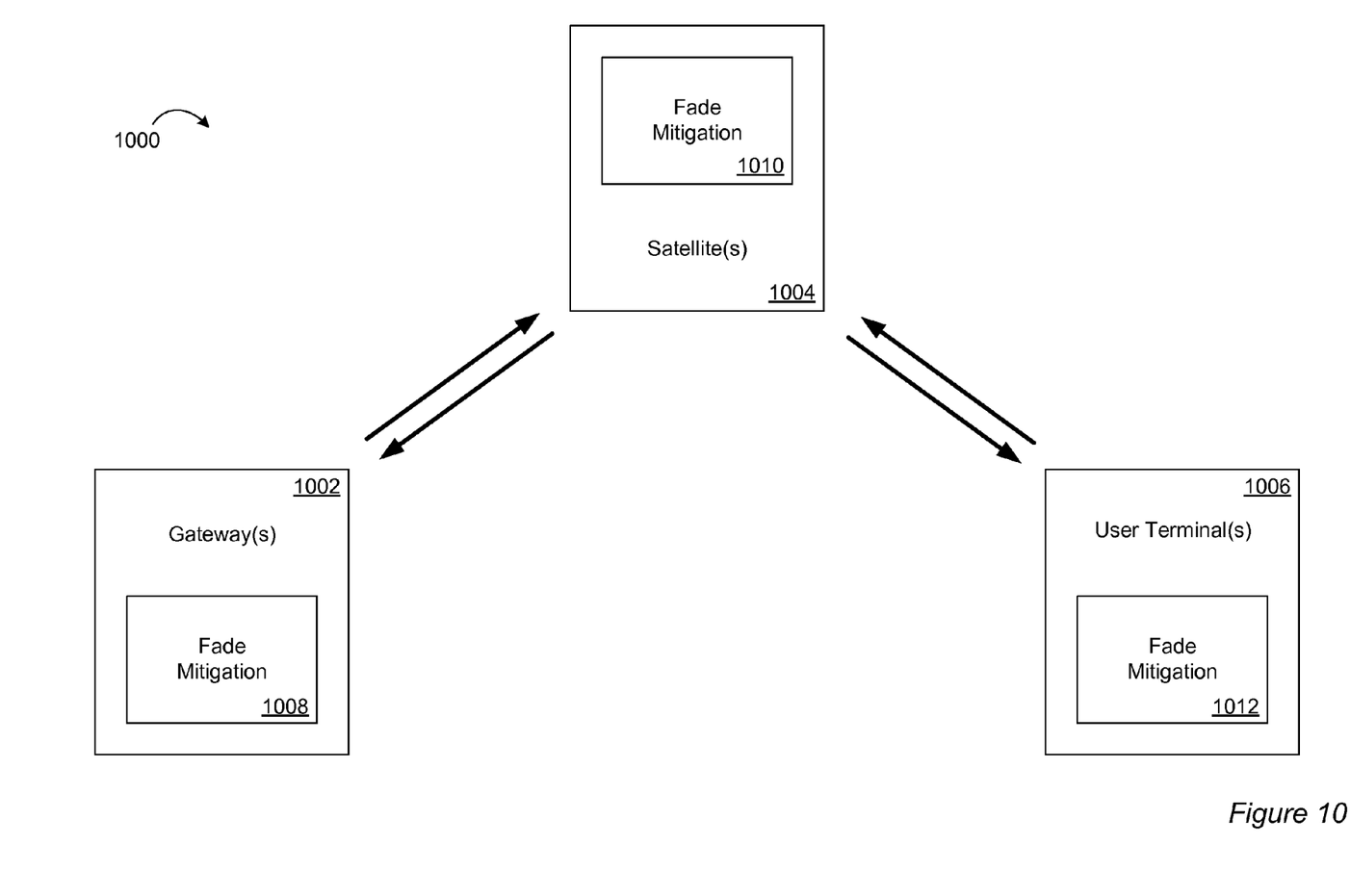
FIG. 10 is a schematic diagram depicting aspects of an example satellite communication system incorporating fade mitigation in accordance with at least one embodiment of the invention.

One or more fade mitigation components may be incorporated into the satellite communication system 800 (FIG. 8). In accordance with at least one embodiment of the invention, FIG. 10 depicts fade mitigation component location options in an example satellite communication system 1000. The satellite communication system 1000 may include one or more satellite communication gateways 1002 corresponding to one or more of the gateways 904, 906, 908, 912 of FIG. 9 and/or the hub 802 of FIG. 8, one or more satellites 1004 corresponding to one or more of the satellites 832, 834 of FIG. 8, and one or more user terminals 1006 corresponding to one or more of the user terminals 808-822 of FIG. 8. The one or more gateways 1002 may collectively or individually incorporate a fade mitigation component 1008. The one or more satellites 1004 may collectively or individually incorporate a fade mitigation component 1010. The one or more user terminals 1006 may collectively or individually incorporate a fade mitigation component 1012. FIG. 10 depicts each of the gateway(s) 1002, the satellite(s) 1004 and the user terminal(s) 1006 as incorporating a fade mitigation component 1008, 1010, 1012. However, each embodiment of the invention is not so limited. As will be apparent to one of skill in the art, fade mitigation functionality in accordance with an embodiment of the invention may be distributed among the fade mitigation components 1008, 1010, 1012 in a variety of suitable configurations.

Figure 11:
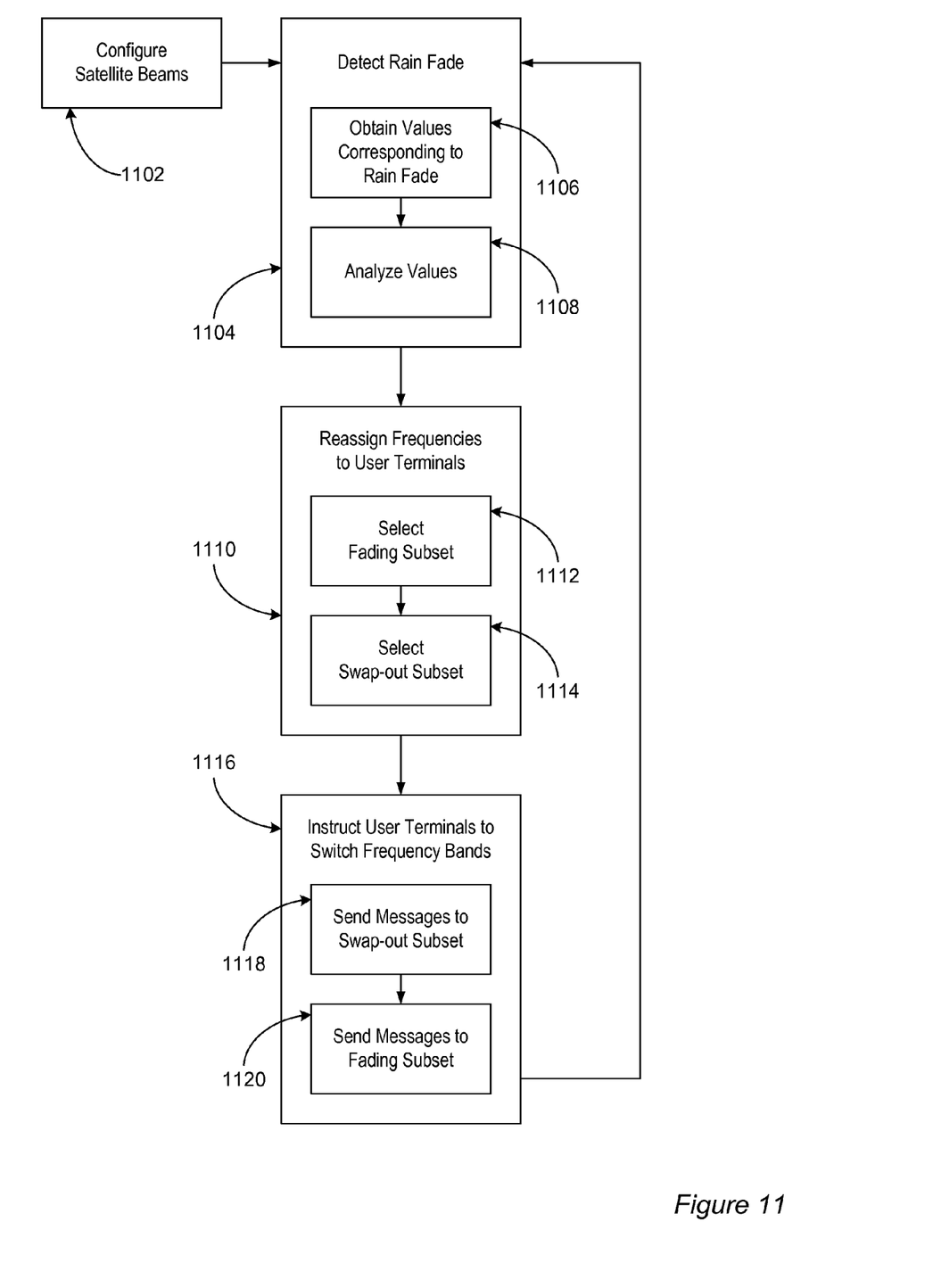
FIG. 11 is flowchart depicting example steps for multi-band satellite communication fade mitigation in accordance with at least one embodiment of the invention.

FIG. 11 depicts example steps for multi-band satellite communication fade mitigation in accordance with at least one embodiment of the invention. At step 1102, multiple satellite beams may be configured. For example, the beams 704-718 of the satellite 702 may be configured as depicted in FIG. 7. At step 1104, rain fade may be detected. For example, at step 1106, one or more values corresponding to rain fade may be obtained and, at step 1108, the obtained values may be analyzed to detect the rain fade. Rain fade may be detected by one or more of the fade mitigation components 1008, 1010, 1012 of FIG. 10 working alone or collectively. For example, the fade mitigation component 1008 may obtain values such as throughput statistics indicating rain fade in a communication connection between the satellite(s) 1004 and one of the user terminals 1006. Alternatively, or in addition, the fade mitigation components 1010 and/or 1012 may provide suitable such values including explicit rain fade notifications and/or requests for reassignment to a fade-resilient frequency band.

At step 1110, frequencies may be reassigned to user terminals based at least in part on the rain fade detected at step 1104. For example, each of the user terminals 408-422 of FIG. 4 may be reassigned to one of a higher capacity, fade-susceptible frequency band F1 and a lower capacity, fade-resilient frequency band F2 by a fade mitigation component 1008 (FIG. 10) at the hub 402. The fade mitigation component 1008 at the hub 402 may detect that the user terminals 418 are subject to rain fade. At step 1112, the user terminals 418 may be selected as part of a fading subset of the user terminals 408-422. The user terminals 418 are to be switched to the fade-resilient frequency band F2, however, the capacity of the fade-resilient frequency band F2 is currently allocated to the user terminals 408. Accordingly, at step 1114, the user terminals 408 may be selected as part of a swap-out subset of the user terminals 408-412.

At step 1116, user terminals may be instructed to switch frequency bands. For example, the fade mitigation component 1008 (FIG. 10) at the hub 402 (FIG. 4) may send communication frequency band reassignment messages to each of the fading subset of the user terminals 408-422 (at step 1118) and to each of the swap-out subset of the user terminals 408-422 (at step 1120). The targeted user terminals may switch frequency bands upon receipt of the reassignment messages. For example, the user terminals 418 may switch to frequency band F2, and the user terminals 408 may switch to frequency band F1.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments of the invention and does not pose a limitation to the scope of the invention unless otherwise claimed. No language in the specification should be construed as indicating any non-claimed element as essential to an embodiment of the invention.

Preferred embodiments of the invention are described herein, including the best mode known to the inventors for carrying out the invention. Variations of those preferred embodiments may become apparent to those of ordinary skill in the art upon reading the specification. The inventors expect skilled artisans to employ such variations as appropriate, and the inventors intend for the invention to be practiced otherwise than as explicitly described herein. Accordingly, embodiments of the invention include all modifications and equivalents of the subject matter recited in the following claims as permitted by applicable law.

What is claimed is:

1. A system for multi-band satellite communication fade mitigation, comprising a fade mitigation component configured to, at least:
   detect rain fade in communication connections between at least one satellite and a set of satellite communication user terminals located in at least one intersection of a plurality of beams of said at least one satellite, the plurality of beams corresponding to a plurality of communication frequency bands including a relatively fade-resilient frequency band;
   select a fading subset of the satellite communication user terminals based at least in part on the rain fade in the communication connections; and
   send a first set of instructions to the fading subset of the satellite communication user terminals to communicate with said at least one satellite over the relatively fade-resilient frequency band.

2. A system according to the system of claim 1, wherein the set of satellite communication user terminals are assigned to the plurality of communication frequency bands such that total communication capacity is maximized.

3. A system according to the system of claim 2, wherein:
the plurality of communication frequency bands further includes a relatively high capacity frequency band having a variable communication capacity based at least in part on rain fade intensity; and
maximizing total communication capacity comprises determining a communication capacity of at least one of the set of satellite communication user terminals assigned to the relatively high capacity frequency band.

4. A system according to the system of claim 1, wherein
the plurality of communication frequency bands further includes a relatively high capacity frequency band; and
the fade mitigation component is further configured to, at least:
select a swap-out subset of the satellite communication user terminals based at least in part on the fading subset; and
send a second set of instructions to the swap-out subset of the satellite communication user terminals to communicate with said at least one satellite over the relatively high capacity frequency band.

5. A system according to the system of claim 4, wherein selecting the swap-out subset comprises selecting the swap-out subset so as to make available communication capacity associated with the relatively fade-resilient frequency band.

6. A system according to the system of claim 1, wherein detecting rain fade in communication connections comprises obtaining at least one value corresponding to rain fade in each of the communication connections.

7. A system according to the system of claim 6, wherein said at least one value corresponding to rain fade comprises at least one value corresponding to communications throughput between said at least one satellite and at least one of the set of satellite communication user terminals.

8. A system according to the system of claim 1, wherein
the plurality of communication frequency bands further includes a relatively high capacity frequency band;
the plurality of beams comprises a plurality of spot beams corresponding to the relatively high capacity frequency band and a beam corresponding to the relatively fade-resilient frequency band; and
the beam corresponding to the relatively fade-resilient frequency band has a coverage area that substantially contains a collective coverage area of the plurality of spot beams corresponding to the relatively high capacity frequency band.

9. A system according to the system of claim 1, wherein the fading subset of the satellite communication user terminals comprises at least some of the satellite communication user terminals most affected by rain fade.

10. A system according to the system of claim 1, wherein the fading subset of the satellite communication user terminals comprises at least some of the satellite communication user terminals most likely to be affected by rain fade.

11. A system according to the system of claim 1, wherein the fade mitigation component is incorporated into a satellite communications gateway.

12. A system according to the system of claim 1, wherein the fade mitigation component is incorporated into a satellite.

13. A system according to the system of claim 1, wherein the fade mitigation component is incorporated into a satellite communication user terminal.

14. A system for multi-band satellite communication fade mitigation, comprising:
a plurality of types of satellite communication user terminal located in at least one intersection of a plurality of beams of at least one satellite, wherein the plurality of beams correspond to a plurality of communication frequency bands including a relatively fade-resilient frequency band, wherein at least one satellite communication user terminal of at least one of the plurality of types of satellite communication user terminal is configured at least to communicate with said at least one satellite over the plurality of communication frequency bands, and wherein utilization of the plurality of communication frequency bands is based at least in part on at least one value corresponding to rain fade in communication between said at least one satellite communication user terminal and said at least one satellite.

15. A system according to the system of claim 14, wherein communicating with said at least one satellite over the plurality of communication frequency bands comprises communicating with said at least one satellite on a schedule based at least in part on said at least one value corresponding to rain fade.

16. A system according to the system of claim 14, wherein the plurality of types of satellite communication user terminal comprises at least one type of satellite communication user terminal configured at least to communicate with said at least one satellite over less than all of the plurality of communication frequency bands.

17. A system according to the system of claim 14, wherein the plurality of beams collectively cover a geographical area sufficiently large that, at times, rain fade intensity varies significantly throughout the geographical area.

18. A system according to the system of claim 14, wherein coverage areas of the plurality of beams are selected based at least in part on historical rain fade data.

19. A satellite capable of participating in multi-band satellite communication fade mitigation, the satellite configured to, at least:
obtain at least one value corresponding to rain fade in communication between the satellite and a set of satellite communication user terminals located in an intersection of a plurality of beams of a set of satellites including the satellite, the plurality of beams corresponding to a plurality of communication frequency bands including a relatively fade-resilient frequency band; and
instruct a fading subset of the satellite communication user terminals to communicate with at least one of the set of satellites over the relatively fade-resilient frequency band, the fading subset of the satellite communication user terminals selected based at least in part on said at least one value corresponding to rain fade.

20. A satellite according to the satellite of claim 19, wherein:
the plurality of communication frequency bands further includes a relatively high capacity frequency band; and
the satellite is further configured at least to instruct a swap-out subset of the satellite communication user terminals to communicate with at least one of the set of satellites over the relatively high capacity frequency band, the swap-out subset of the satellite communication user terminals selected based at least in part on the fading subset.

21. A satellite according to the satellite of claim 19, wherein the set of satellites comprises a plurality of satellites.

22. A satellite according to the satellite of claim 21, wherein each of the plurality of satellites corresponds to one of the plurality of communication frequency bands.

* * * * *